Sept. 1, 1970   R. J. DE LONG ET AL   3,526,866

RESISTOR WITH TERMINAL IN HOUSING

Filed May 7, 1969

INVENTORS.
ROBERT J. DE LONG.
HARRY W. FLETCHER.
BY Frank N. Decker jr.
ATTORNEY.

United States Patent Office 3,526,866
Patented Sept. 1, 1970

3,526,866
RESISTOR WITH TERMINAL IN HOUSING
Robert J. De Long, Temple City, and Harry W. Fletcher, West Covina, Calif., assignors to Spectrol Electronics Corporation, City of Industry, Calif., a corporation of Delaware
Filed May 7, 1969, Ser. No. 822,583
Int. Cl. H01c 1/02
U.S. Cl. 338—276          7 Claims

ABSTRACT OF THE DISCLOSURE

A terminal for a potentiometer having an enlarged head with a screw driver slot and a screw threaded shank threadably engaged in the housing of the potentiometer. An electrical conductor is secured to the resistance element of the potentiometer and passes outwardly from the housing through the passage in the terminal. A bimetallic brazing member having a base metal outer layer and a thin silver solder inner layer is laid in the screw driver slot on top of the conductor wire. Electric current is passed through the brazing metal layer to seal the passage in the terminal to the base metal layer and the conductor wire to provide a sealed terminal free from conductor wire embrittlement problems.

BACKGROUND OF THE INVENTION

This invention relates to solderable electrical terminals for electrical or electronic components, such as potentiometers, which are contained in a closed housing.

Various electrical components, such as potentiometers and switches, require external electrical terminals on their housing. Such terminals may take the form of a hollow screw inserted within the casing through which a conductor wire is inserted and secured by welding or soldering to the screw to make electrical contact.

In the past, difficulties have been experienced with electrical terminals for such components. For example, if the conductor wire is resistance welded to the terminal, it is likely that the passage in the terminal screw will not be sufficiently sealed to prevent the entrance of moisture and dirt into the housing which may result in unsatisfactory operation of the component within.

The passage in the terminal screw may be filled by melting soft solder and allowing it to solidify in the passage. However, this solution has the serious disadvantage that the solder may be remelted by the heat from a subsequently applied soldering iron, used to make an external connection to the terminal. Remelting the solder may not only open the passage up to atmosphere but also the melted solder may drip into the interior of the housing causing damage to the electrical component therein.

A brazing alloy may be melted and solidified in the terminal screw passage in order to overcome the desoldering problem but prior use of brazing materials has presented additional problems. Brazing normally requires substantial heating of the terminal and a quantity of brazing metal. The brazing metal alloy tends to run down the hot conductor wire through the passage in the terminal screw and coat the wire. The metal coated conductor wire then becomes brittle causing premature failure of the component when it is subjected to vibration. Another problem in the use of brazing metal arises because of the excessive amount of heat which needs be applied in the region of the terminal in order to seal the passage therein. Miniaturized electrical components are frequently very delicate and various parts and wires can be severely oxidized or otherwise injured if sufficient heat is applied to melt a brazing alloy on the terminals thereof by prior methods.

Accordingly, it is a principal feature of this invention to provide an improved electrical component terminal and method of making it which overcomes problems experienced with prior electrical component terminals.

SUMMARY OF THE INVENTION

In accordance with a preferred embodiment of this invention, there is provided an electrical component having a terminal inserted in an aperture in the component. The terminal preferably comprises a hollow threaded body member provided with a screw driver slot in the head thereof. A conductor wire is passed through the interior passage of the terminal and bent at a right angle into the screw driver slot. A preformed brazing member having a base metal layer and a more electrically conductive brazing metal layer is inserted in the screw driver slot with the brazing metal in contact with the conductor wire. Electric current is then passed at spaced locations through the base metal layer into the brazing metal and through the brazing metal to locally heat and melt the brazing metal. Only sufficient heat is applied by this method in a small area to assure that the base metal layer, the terminal screw, and the conductor wire are integrally secured together when the brazing metal solidifies.

The terminal described is free from the problems of embrittlement of the conductor wire and excessive heating of the terminal during manufacture, because only a minute quantity of brazing metal is utilized and the entire terminal need not be heated to any appreciable extent. Consequently, the brazing metal does not flow down the length of the conductor wire and cause embrittlement thereof nor is excessive heat applied to damage the wire or any portion of the electrical component.

DESCRIPTION OF THE PREFERRED EMBODIMENT

Figure 1:
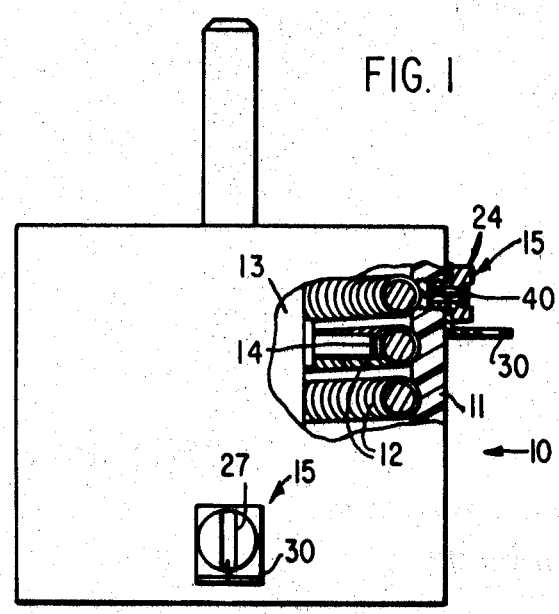
FIG. 1 illustrates a plan view partly in cross-section of a potentiometer having an improved terminal in accordance with the present invention.

Referring particularly to FIG. 1, an electrical component 10, such as a switch or a potentiometer is enclosed within a housing 11. The illustrated potentiometer comprises a helical wire-wound resistance element 12 and and rotor member 13 which carries a suitable wiper element 14. A plurality of electrical terminals 15 are secured at the exterior of housing 11 and are connected with the electrical components in the interior of the housing.

Figure 2:
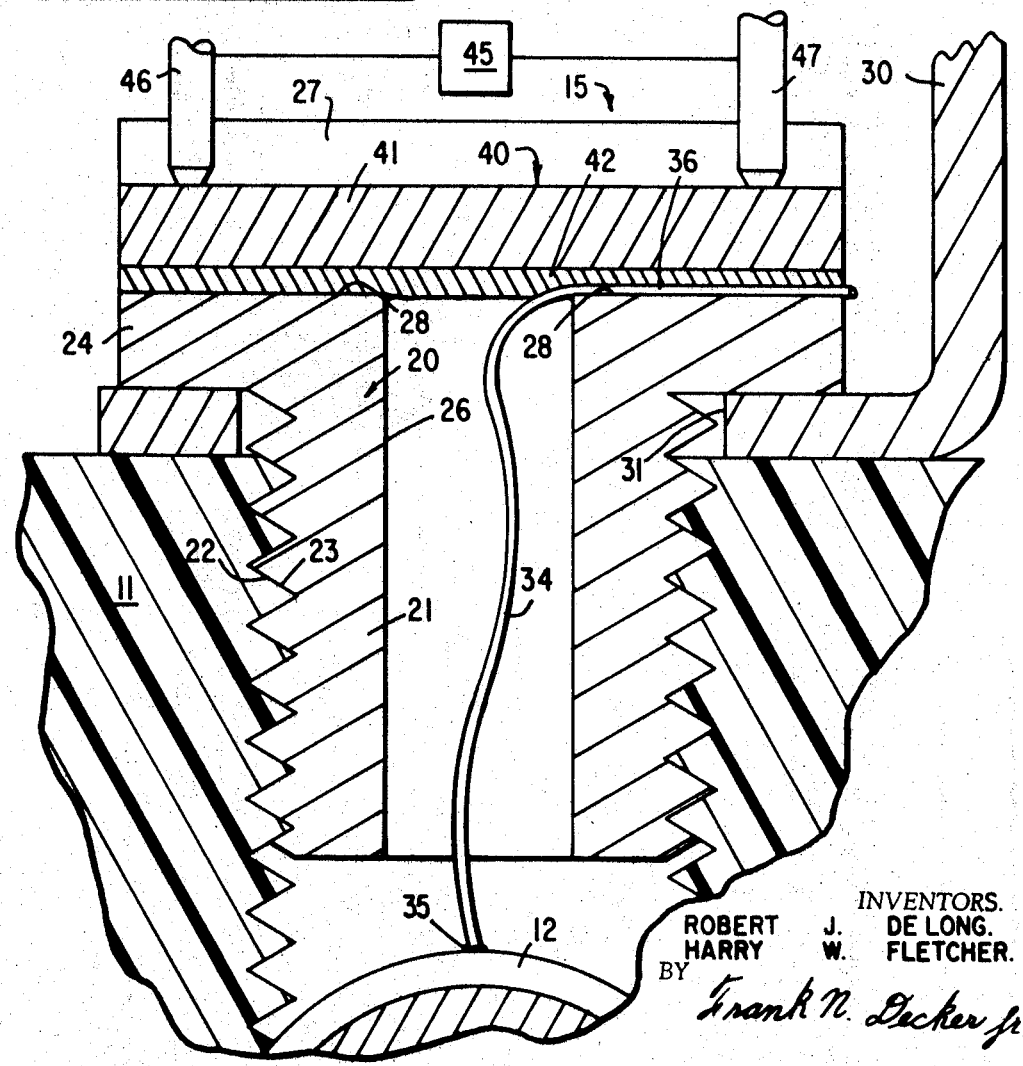
FIG. 2 is a detailed cross-sectional view through a completed terminal made in accordance with this invention, illustrating the positioning of welding electrodes during manufacture.

As shown in FIG. 2 in greater detail, terminal 15 comprises an electrically conductive metal body member 20 having a shank 21 with external screw threads 22 formed thereon. Screw threads 22 are engaged in screw threads 23 formed in an aperture extending through housing 11 from the exterior to the interior thereof. Body member 20 of terminal member 15 further includes a head 24 of larger diameter than shank 21. A cylindrical interior passage 26 extends coaxially through shank 21 of body member 20 and the passage is open at both ends, as initially formed. A suitable transverse tool engaging slot 27, such as a screw driver slot, is formed at the outer end of head 24. Transverse slot 27 extends radially outwardly from passage 26 and forms a pair of transverse, outwardly extending, recessed shoulders 28 adjacent the outer end of the body member.

A solder terminal lug 30 is formed with an aperture 31 therein having a larger cross-sectional dimension than shank 21 but of smaller cross-sectional dimension than head 24. Threaded shank 21 is inserted in aperture 31 and a screw driver or other tool is inserted in slot 27 to screw body 20 into threaded aperture 23 of housing 11. Securing of shank 21 by threading it into housing 11 retains terminal lug 30 under the head of body 20.

A conductor wire 34, which may be of relatively very small diameter such as about 0.001 inch in diameter, extends through passage 26 and is welded at its inner end 35 to resistance wire 12 of the potentiometer. The outer end 36 of conductor wire 34 is bent at a substantially right angle so that it lies on the surface of recessed shoulder 28 formed in head 24 by slot 27. Preferably, the length of conductor wire 34 is somewhat greater than the distance between shoulder 28 and weld 35 so that the wire is slightly bent to provide for thermal expansion and contraction of the elements as well as to enable the accommodation of some vibration.

After conductor wire 34 has been positioned, as shown in the drawing, a bimetallic brazing member 40 comprising a base metal layer 41 and a brazing metal layer 42 is positioned in tool slot 27 with the brazing metal layer facing shoulder 28 and in contact with outer end 36 of conductor 34.

Bimetallic brazing member 40 is preferably a preformed bimetallic bar of rectangular or other suitable shape for insertion into a correspondingly shaped tool recess 27. For example, brazing member 40 may be a rectangular bar having a length substantially equal to the transverse dimension of slot 27 and of a size substantially conforming to the shape of the slot. Brazing member 40 and transverse slot 27 have a length greater than the diameter of passage 26 so that the brazing member completely covers the passage when resting on shoulders 28. Base metal layer 41 my comprise a layer of brass or copper about 0.004 inch thick. Brazing metal layer 42 may comprise a layer of silver solder or other brazing material about 0.002 inch thick having a lower melting point and a preferably higher electrical conductivity than base metal layer 41. Brazing metal layer 42 may be of any suitable composition having a higher melting temperature than that of soft solder and preferably has a melting temperature above about 800° F.

When brazing member 40 is positioned in tool slot 27, as described, electrodes 46 and 47 of a suitable welding current source 45 are positioned in spaced contact with base metal layer 41 of brazing member 40. As shown in the drawing, electric current from source 45 passes between the spaced electrodes and through base metal layer 41 into and through the portion of brazing metal layer 42 between the electrodes. Brazing metal layer 42 has a lower melting point and preferably is of greater electrical conductivity than that of base metal layer 41, so that the brazing metal is selectively and preferentially melted by passage of welding current. The passage of current through brazing metal layer 42 selectively melts the brazing metal and integrally bonds and seals base metal layer 41 to shoulders 28 of body member 20 and to outer end portion 36 of conductor wire 34 to provide a good electrical and mechanical joint therebetween. When the brazing metal 42 solidifies, as shown in the drawing, passage 26 in body 20 is completely sealed from the entrance of ambient atmosphere, moisture and dirt into the interior of housing 11.

Because of the small amount of heat necessary to melt brazing metal layer 42 and because the heat is concentrated at precisely the region between the electrodes at which the braze is desired, neither conductor wire 34 nor body 20 is substantially heated except in the region where the brazing is desired. Consequently brazing metal largely avoids the tendency to flow downwardly along conductor 34. As previously explained, embrittlement of conductor 34 is thereby avoided, because the brazing metal does not tend to coat it, except in the region of the braze.

Furthemore, since the entire terminal assembly is not heated to any substantial extent during its manufacture, oxidation and heat damage to conductor 34, housing 11, and the electrical component itself, is largely avoided. Ordinary soft soldering will not destroy the seal formed by brazing metal layer 42 because of the difference in melting points between the brazing metal and soft solder.

It will be appreciated that terminal lug 30 may be omitted, if desired, in which case it may be preferable to form head portion 24 with a longer, outwardly extending, concave head portion so that an external conductor wire can be directly soft soldered to the head of terminal 15. It will also be appreciated that while the preferred embodiment utilizes a threaded connection between shank 21 and housing 11, various other methods of attachment, such as riveting or cementing, may be utilized within the scope of this invention.

A terminal made in accordance with this invention overcomes the disadvantages of prior terminals and enables the terminal assembly to remain sealed without requiring excessive heat during manufacture. The problems of embrittlement of the conductor wire and integrity of the seal during external soldering to the electrical component are likewise overcome while the manufacture of the component terminal is rendered simple, inexpensive and highly adaptable to large scale production.

A preferred embodiment of this invention has been illustrated and described, but it will be appreciated that the invention may be otherwise embodied within the scope of the following claims.

We claim:

1. An electrical component having a solderable terminal comprising a housing enclosing said component, an aperture in said housing, and terminal means disposed in the aperture in said housing for making electrical contact with said electrical component external of said housing, said terminal means comprising:

(A) an electrically conductive metal body member having a shank secured in the aperture in said housing and having an end thereof extending out of said housing; a passage extending axially through said body member and communicating with the interior of said housing; a transverse slot extending from the axial passage in said body member at the end thereof extending out of said housing; said transverse slot having a greater cross-sectional dimension than a corresponding cross-sectional dimension of said axial passage so that the slot forms a recessed shoulder extending outwardly from the exterior end of said axial passage;

(B) an electrically conductive metal wire electrically connected with the electrical component in the interior of said housing and extending out of said housing through the axial passage in the body member of said terminal, the outer end portion of said wire being bent at an angle and lying in said transverse slot on the recessed shoulder formed thereby; and (C) a bimetallic metal brazing member overlying said wire in said transverse slot, said metal brazing member substantially conforming to the dimensions of said transverse slot, said brazing member comprising a layer of base metal and a layer of solidified brazing metal underlying said base metal on the side thereof facing said shoulder, said brazing metal joining the terminal wire and the base metal of the brazing member to the shoulder of said body member over the end of said axial passage in said body member to seal the outer end of said terminal, said brazing metal having a melting point above that of soft solder so that an external wire may be soft soldered to said terminal without releasing said terminal wire or unsealing said housing.

2. An electrical component as defined in claim 1 wherein said transverse slot in the body member of said terminal comprises a tool engaging recess, and the shank of said body member has a screw thread thereon whereby said slot is adapted to be engaged by a tool for threadably inserting and retaining the terminal in the aperture in said housing during assembly of said electrical component.

3. An electrical component as defined in claim 1 wherein the body of said terminal member includes a head secured to the outer end of said shank, said head having a larger transverse dimension than said shank, a lug member having an aperture therein larger than the cross-section of said shank and smaller than that of said head, said lug being retained by the head of said body member on the exterior of said housing with the shank of said body member extending through the aperture in the lug into the aperture in said housing.

4. An electrical component as defined in claim 1 wherein said brazing metal layer has a higher electrical conductivity than said base metal layer.

5. A method of making a sealed terminal at the exterior of a housing for an electrical component which comprises the steps of:

(A) forming an aperture in the housing;

(B) forming a terminal body member having a shank adapted to be inserted into the aperture in said housing, said terminal member being formed with an axially extending passage therethrough and with a transverse slot at one end thereof which forms a recessed shoulder extending outwardly from said axial passage;

(C) inserting and securing the shank of said terminal member in the aperture of said housing;

(D) inserting a conductor wire through the axial passage in the terminal and making electrical connection with said electrical component in the interior of said housing;

(E) bending the wire into the transverse recess of said terminal member;

(F) inserting a brazing member having a base metal layer and an electrically conductive brazing metal layer into said transverse recess with the brazing layer facing inwardly toward the recessed shoulder in said transverse recess and contacting the conductor wire in said recess; and (G) contacting the outer surface of the brazing member at spaced locations thereon with the terminals of a source of electric current, passing electric current between said terminals through said base metal layer into said brazing metal layer, and through said brazing metal layer to selectively melt the brazing metal, and discontinuing passage of electric current through said brazing member to solidify the molten brazing metal, thereby integrally joining the terminal body member, the conductor wire, and the base metal of the brazing member to seal the passage in the terminal body member and retain the conductor wire in electrical contact with the body member of the terminal.

6. A method of making a sealed terminal as defined in claim 5 including the steps of forming threads on the shank of said terminal body member, and wherein the step of inserting and securing the terminal body member into said housing comprises the steps of inserting a tool into the recess in said terminal body member and rotating the inserted tool to screw the threaded shank of the body member of the terminal into the housing prior to inserting the conductor wire in the axial passage of the terminal body member.

7. A method of making a sealed terminal as defined in claim 5 including the steps of forming a terminal lug having a hole formed therein of a size at least as great as the shank of said terminal member; and inserting the shank of the terminal member through the hole in said terminal lug prior to inserting and securing the terminal member in said housing.

References Cited
UNITED STATES PATENTS 3,356,981   12/1967   Jones _____ 338—276

E. A. GOLDBERG, Primary Examiner

U.S. Cl. X.R.

29—619; 338—329